US008430387B2

(12) United States Patent
Roser

(10) Patent No.: US 8,430,387 B2
(45) Date of Patent: Apr. 30, 2013

(54) LEVERAGE BASED CUTTING BOARD SYSTEMS

(76) Inventor: Mark Costin Roser, Hebron, CT (US)

( * ) Notice: Subject to any disclaimer, the term of this patent is extended or adjusted under 35 U.S.C. 154(b) by 332 days.

(21) Appl. No.: 12/961,637

(22) Filed: Dec. 7, 2010

(65) Prior Publication Data

US 2011/0133383 A1 Jun. 9, 2011

Related U.S. Application Data

(60) Provisional application No. 61/285,174, filed on Dec. 9, 2009.

(51) Int. Cl.
*B23Q 3/00* (2006.01)
*A47J 47/00* (2006.01)
*B25H 1/04* (2006.01)

(52) U.S. Cl.
USPC .................... 269/290; 269/289 R; 269/302.1; 83/651.1; 83/699.51

(58) Field of Classification Search .................. 269/290, 269/289 R, 302.1, 291, 32; 83/651.1, 699.51; 29/281.1
See application file for complete search history.

(56) References Cited

U.S. PATENT DOCUMENTS

| | | | | |
|---|---|---|---|---|
| 717,223 | A | 12/1902 | Leachman | |
| 3,780,436 | A * | 12/1973 | Pellman | 30/123 |
| 4,094,221 | A * | 6/1978 | Jacoby | 83/762 |
| 4,137,807 | A | 2/1979 | Schaumberg | |
| 4,811,642 | A * | 3/1989 | Sorbie | 83/574 |
| 5,860,641 | A * | 1/1999 | Heath | 269/289 R |
| 5,899,133 | A | 5/1999 | Halladay et al. | |
| 5,927,701 | A * | 7/1999 | Chapman | 269/87.2 |
| 6,564,685 | B1 * | 5/2003 | Beaton | 83/609 |
| 7,455,005 | B2 * | 11/2008 | Giessler | 83/605 |
| 2011/0133383 | A1 * | 6/2011 | Roser | 269/290 |

* cited by examiner

*Primary Examiner* — Lee D Wilson

(57) ABSTRACT

A leverage based cutting board system having a rotatable tower and sliding knife holster is disclosed. Control of the height of the sliding knife holster and unique locking system facilitates cutting of foodstuffs of a variety of shapes and consistencies. The system further provides an advantage of using any traditional knife. It allows rapid switching between traditional cutting and leverage cutting. The system decreases the total scale of force required to cut foodstuffs and constrains the number of untoward knife motions. The tower with its unique property of rotating 180 degree makes it apt to use both the surfaces in a single preparation. The unique texture of the board helps it to grip slippery food items. The sleek and compact design helps keeping the tower intact as it lies horizontally adjacent to the board when not in use.

20 Claims, 22 Drawing Sheets

LEVERAGE BASED CUTTING BOARD SYSTEMS

This application claims the benefit of U.S. Provisional Application Ser. No. 61/285,174 filed Dec. 9, 2009, entitled "Leverage Based Cutting Board Systems" which is incorporated herein by reference as to its entire contents.

FIELD OF THE INVENTION

The technical field relates to leverage based cutting systems having means for enabling the user to utilize a variety of common kitchen knives in traditional cutting as well as leverage-assisted cutting thereby reducing the effort of food preparation while constraining the number of untoward knife motions in the cutting of a wide variety of foodstuffs even for people of limited dexterity and strength.

BACKGROUND OF THE INVENTION

Food preparation consumes a considerable amount of time and energy in the daily routine of many families' lives. The effort required for cutting or slicing larger vegetables can be problematic, especially for people with limited strength or dexterity. Large vegetables, such as turnips, squash, melon, yarns, and others all represent a particularly problematic challenge, since the force required to chop these vegetables is considerable and they all have a tendency to roll. Many users find this lack of stability to be a challenge and a safety concern.

By providing a pivot point that is integrated to the food preparation surface, one can match their cutting device into a pivot point and place the food to be cut between the pivot and the handle of the cutting device. In such a way, the user gains beneficial leverage while constraining the total number of forces to be managed. This greatly reduces cutting effort, reduces undesired knife motion and reduces untoward motion of foodstuffs. When the knife is cutting in a downward direction on the food, the force on the pivot point will be in the upward direction. There will also be linear forces along the knife. Typically, linear forces are along a vector that emanates from the hand on the handle pushing down toward the blade.

Other cutting devices known in the art include traditional paper cutters as well as a leverage cutting board known as the "Cape-Cod Cutting Board" and other devices that connect the knife to a pivot attached to the cutting board. Slicing devices known in the prior art generally comprise a frame coupled to a blade in one of several well-known configurations. In one example of a typical slicing device, the blade is fixed to the frame. The foodstuff is sliced by moving the foodstuff over or under an exposed element of the blade. Users may encounter difficulty when there is a small amount of foodstuff between their hand and the blade.

The prior art also discloses a slicing device where the knife is pivotably mounted to the frame. U.S. Pat. No. 4,054,994 provides a fixture for attaching a knife to a breadboard. The front end of the knife is pivoted to the attachment so that the knife may be pivotably swung for chopping foodstuff. In another arrangement the knife is provided with a longitudinally extending slot at the forward end so that the knife may be guided and moved longitudinally for slicing food and the like. The prior art also discloses a knife-like device with parallel blades for chopping food. The blades may be pivotably attached to the frame and coupled together to move in parallel to each other. As will be evident to one skilled in the art, the inability to move the pivot axis with respect to the frame will constrain the knife edge to move along a fixed slicing path and will likely limit the size of foodstuff that can be sliced using such an arrangement.

In U.S. Pat. No. 717,223 the adjustable slicing device is disclosed which attempts to solve the problem of the positioning of the blade when it makes its initial slice by slidably coupling the blade or blades to a post mounted perpendicular to the base. This slicing device has limits to variety of sizes of foodstuffs that can be sliced and the slicing device cannot be effectively used to slice hard foodstuffs such as squash.

In U.S. Pat. No. 6,564,685 a cutting board and a leveraged knife apparatus which facilitates cutting of objects is disclosed. The apparatus includes a cutting board having a vertically oriented support member having a plurality of fulcrums positioned at convenient, discrete vertical intervals proceeding upwardly from the cutting board. The apparatus includes a knife probably a chef's knife, with tip of blade having on its upper proximate edge, means for removably engaging a convenient one of the fulcrums. However, the disadvantage with the art is that there is a limitation on the precision to which the height of the knife can be adjusted. The size of the foodstuff being sliced is generally limited. This happens because the distance between the knife and board is fixed. Assuming that the cutting device starts parallel to the cutting surface, after cutting mid way through a large vegetable or fruit, intentional removal of the knife might be required to change the fulcrum point to a lower one so as to continue further cutting of the article, thus making the process cumbersome at times. Further, a specially provisioned knife has to be used with the same.

Yet another prior art discloses a repositionable blade with a pair of bosses. In U.S. Pat. No. 7,455,005, the pair of bosses on the knife preferably coupled to a set of fixed fulcrums acting as a pivot for the blade is described. The pivot or lever action of the blade permits a user to more easily cut through tough or hard foodstuff. It has multiple fulcrum points to permit a user to lower the blade to make successively deeper slices. The slicing device may also dissemble for cleaning and sanitizing. However, the disadvantages with the art include that there is a limitation on the precision to which the height of the knife can be adjusted, that it will not function without a specialized knife with bosses, and that the engagement is prone to unwanted disengagement. The knife being used is a specially customized knife with a protocol for assembling it with the apparatus before being used. The device requires that the user pull on the handle while cutting to prevent disengagement of the knife bosses to the fulcrums and the consequential auto-release. Exerting a constant pulling upon a knife while cutting is not a natural activity for many people. The manufactures have added a downward facing segment at the rear edge of the specialized knife handle that presumably may assist in exerting such a pulling force. A special additional locking mechanism is specified, which fixes the specialized knife into only one fulcrum, it may become separated from the device in the kitchen and be unavailable for use.

SUMMARY OF THE INVENTION

According to the present invention there is disclosed a leverage based cutting apparatus with adjustable and detachable tower having a sliding holster on it and a base having two surfaces opposing each other and equally capable of receiving the foodstuffs to be sliced or chopped. The tower has a toothed rack present on one of its front face, sidewalls, rear wall and chamfered edge to engage the sliding holster at an adjustable height. The sliding holster can be moved vertically along the length of the erect tower so as to adjust the pivot height for preferred leverage action while cutting a foodstuff. The sliding holster has at least one tooth to engage with the toothed rack, and an opening slot to receive the anterior end of a cutting device such as a kitchen knife. The sliding holster is locked and unlocked by generation of pressure through the knife into the sliding holster, said holster having a mechanism that maintains the teeth of the holster away from the toothed rack until such sufficient pressure engages the holster teeth with the toothed rack. In an embodiment, the sliding holster is normally unlocked due to an outward pressure generated by a spring member on the sliding holster; when the tip of the knife exerts a counter pressure on the rear wall of the member, thus overcoming the pressure of the spring member, the sliding holster locks with the tower by engaging at least one tooth on the sliding holster with at least one toothed rack. The locking and unlocking of the sliding holster can be visually observed by the user allowing a natural understanding of the mechanism and the necessary force required to maintain locked engagement. Windows on the side walls of the tower provide easy access to the center of the sliding holster to remove debris that may enter. In one embodiment of the invention, the spring member comprises a leaf spring.

In an embodiment of the invention, the tower can be rotated through different positions, lying horizontally adjacent to the base when not in use and lying vertical to the base when readied for perpendicular cutting. The tower may be rotated to other angles given proper locking mechanism to allow for obtuse or acute cutting angles. As such, the aesthetics and ease of storage of a cutting board when not in use is maintained.

In another embodiment, the surfaces of the base have a groove extending through is breadth from the point of attachment of the tower to receive the cutting device in operation, said groove is further encapsulated by a variety of materials to enhance the functionality of the system; for example, a metal strip so as to obviate the chipping of the base surface itself or a variable durometer deformable elastomeric strip of sufficient depth to enable vertical deformation and enable radiused blades to greatly extend the range of contact between the knife edge and the board, thereby helping to cut all the way through a given foodstuff.

In an embodiment of the invention, the sliding holster is locked with the tower through frictional forces generated between the mutually facing respective walls of the tower and sliding holster. The frictional forces may be enhanced by providing bushings in said sliding holster in such a manner that the push force of knife increases the contact surface pressure between the respective facing walls.

In yet another embodiment of the invention, a ball and ramp locking mechanism can be employed, wherein a floating ball is freely positioned in a socket of the sliding holster also against a vertical tower. When the sliding holster moves vertically upward the floating ball is forced downwards in the socket thus developing a pressure on the tower and enabling locking of the sliding holster with the tower. Unlocking is performed by knocking the floating ball upwards with a pin that can be inserted into the socket through an opening in the supporting unit.

BRIEF DESCRIPTION OF THE DRAWINGS

Further aspects, features, embodiments, and advantages of the present invention will become apparent from the following detailed description with reference to the drawings, wherein.

DETAILED DESCRIPTION OF THE DRAWINGS

The invention is directed towards a leverage based cutting and chopping apparatus with adjustable and detachable tower having a sliding holster on it and a base having two surfaces opposing each other and equally capable of receiving the foodstuffs to be sliced or chopped. The tower has a toothed rack present either on its front face, sidewalls, or rear wall and have indents to engage a sliding holster at an adjustable height. The sliding holster has at least one tooth to engage with at least one toothed rack, and an opening slot to receive the anterior end of a cutting device such as a chef's knife. The sliding holster is locked and unlocked due to forward pressure and counter pressure of the cutting device.

In an embodiment, the sliding holster is unlocked due to an outward pressure generated by a leaf spring on the sliding holster. When the tip of cutting device exerts sufficient pressure on the rear wall of the sliding holster, the leaf spring pressure is overcome thus locking the sliding holster with the tower by engaging at least one tooth on the sliding holster with at least one toothed rack. The locking and unlocking of the sliding holster can be observed by the user allowing a natural self-learning of the required forward pressure required to maintain locked engagement. The locking and unlocking of the sliding holster can also be observed through the windows on the side walls of the tower which also allow accessing the center of the sliding holster to remove debris that may have entered.

In an embodiment of the invention, the tower can be flipped, lying horizontally adjacent to the base when not in use.

In an embodiment, the surfaces of the base have a groove extending through is breadth from the point of attachment of the tower to receive the cutting device in operation, said groove is further encapsulated by a variety of materials to enhance the functionality of the system; for example, a metal strip so as to obviate the chipping of the base surface itself or a variable durometer deformable elastomeric strip to enable surface contact with radiused or serrated blades thereby cutting all the way through a given foodstuff.

In an embodiment of the invention, a plurality of towers of different heights for different sizes of foodstuffs and different sizes of cutting devices is disclosed.

In an embodiment of the invention, the tower has side holes or windows to allow the observation of locking and unlocking of the sliding holster and removal of debris that may have entered the sliding holster.

In an embodiment, the toothed rack is present on the side walls of the tower with a wrap-around or semi-wrap around sliding holster attached to it.

Figure 1:
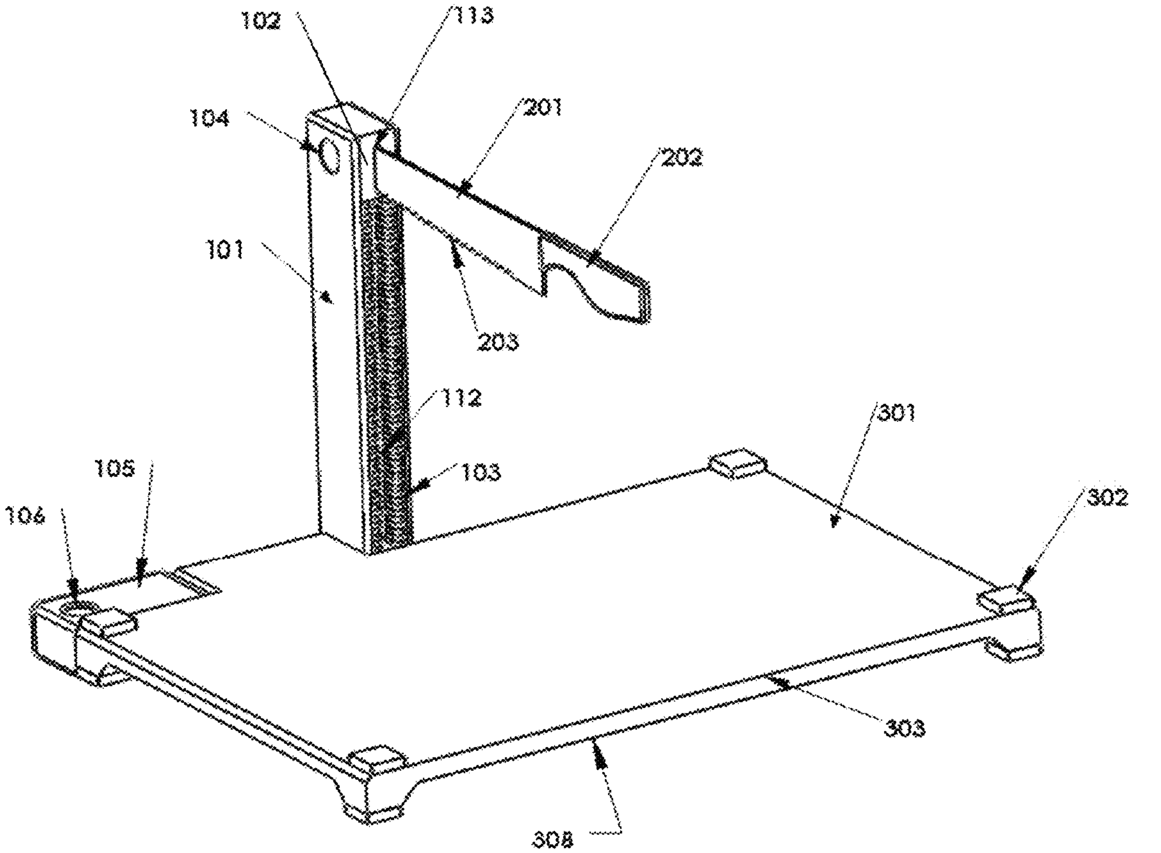
FIG. 1 is a perspective view of the leverage based cutting apparatus.

Referring to FIG. 1, a leverage based cutting apparatus is shown with two flip-towers 101, 105 attached to base 301 having two opposing surfaces 303, 308. The base 301 has anti-skid elements 302 at each corner. The tower 101 is shown with a sliding holster 102 in which a cutting device 201 is engaged through an opening slot 113, said sliding holster 102 slides over the toothed racks 103 on front face of tower 101 having an opening slot 112 for motion of the sliding holster 102 in it. The tower 101 has side holes 104 to enable observation of locking and unlocking of sliding holster and removal of debris. At least one tooth of the sliding holster 102 is engaged with at least one toothed rack 103. The base 301 can be made of any suitable material like wood, polyurethane, thermoplastic, metal etc.

Figure 3:
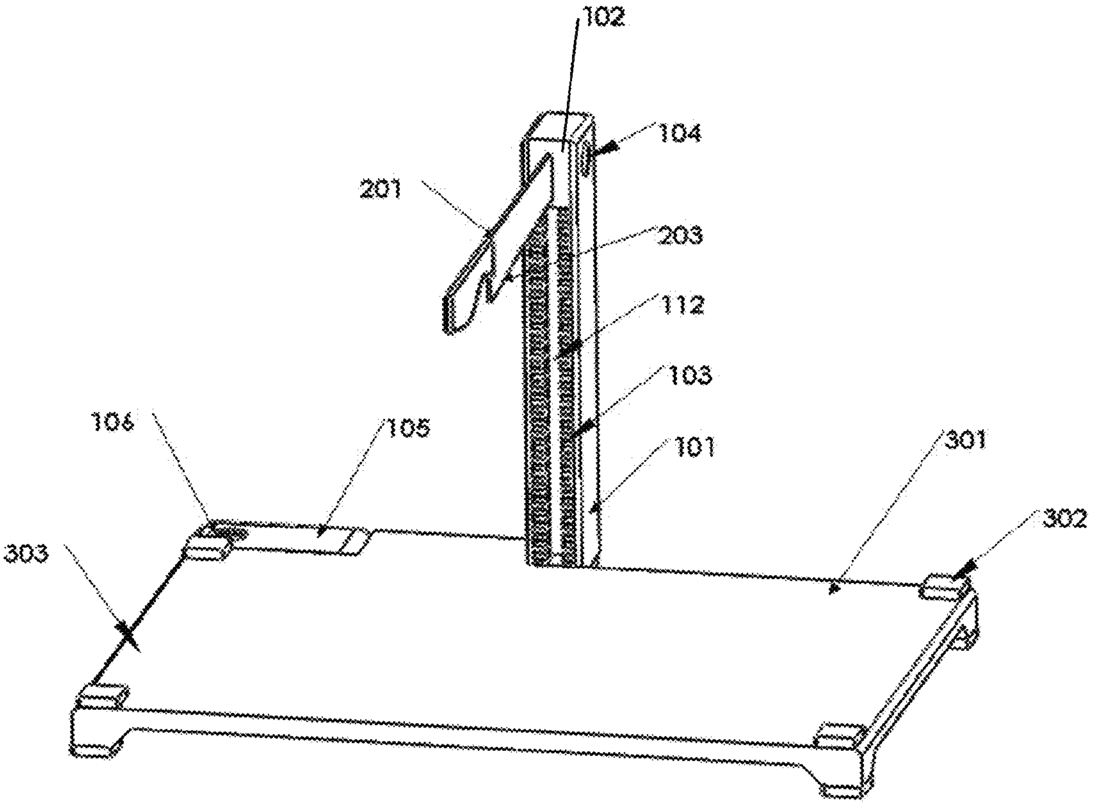
FIG. 3 is a front view of the leverage based cutting apparatus.

In operation, a user can use any familiar cutting device 201 and can cut in a conventional manner upon the cutting surface or can easily switch to leverage based cutting by inserting the tip of the cutting device 201 into the sliding holster 102 as shown in the FIGS. 1 and 3. This process can be used for the smaller tower 105 as well depending on size of article or the discretion of the user. The user can use both the surfaces 303, 308 during same application by flipping either of the towers 101 and 105 to the other side. This is especially useful for people who want to prevent cross contamination and want to cut raw fruit and vegetables and use other surface to cut cooked food without have to wash again in the same preparation. This will save time, be less cumbersome and prepare more hygienic food. The pushing of cutting device 201 into the holster 102 will engage and disengage the lock. The cutting device 201 can also adjust the height of the sliding holster 102 by pushing and sliding across the groove 112 in the vertical plane of the tower 101. The cutting device 201 will drop unlocking itself when pressure is applied downward in absence of the food which is conceived as yet another beneficial feature.

Figure 2:
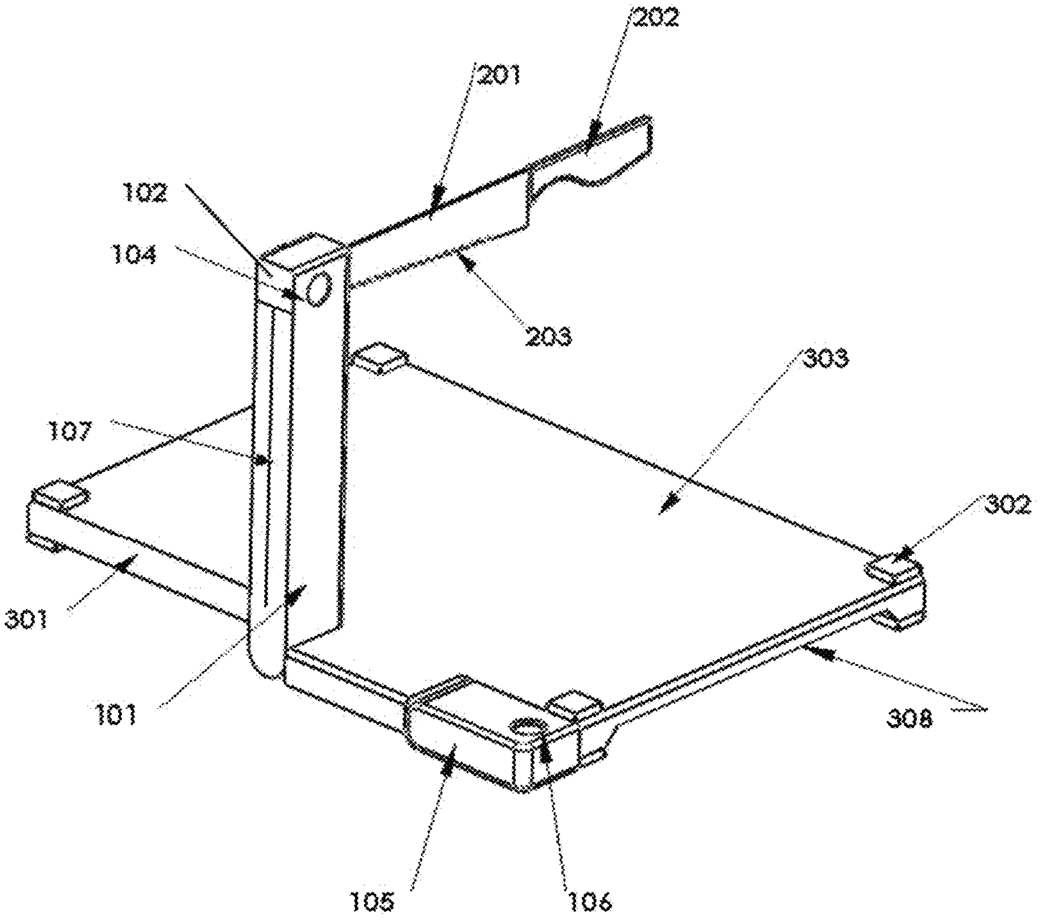
FIG. 2 is a rear view of the leverage based cutting apparatus.

Referring to FIG. 2, a rear view of the leverage based cutting apparatus is shown with two flip-towers 101, 105 attached to the base 301 having two opposing surfaces 303, 308. The base 301 has anti-skid elements 302 at each corner. The tower 101 is shown with a rear wall 107 and side holes 104.

Figure 4:
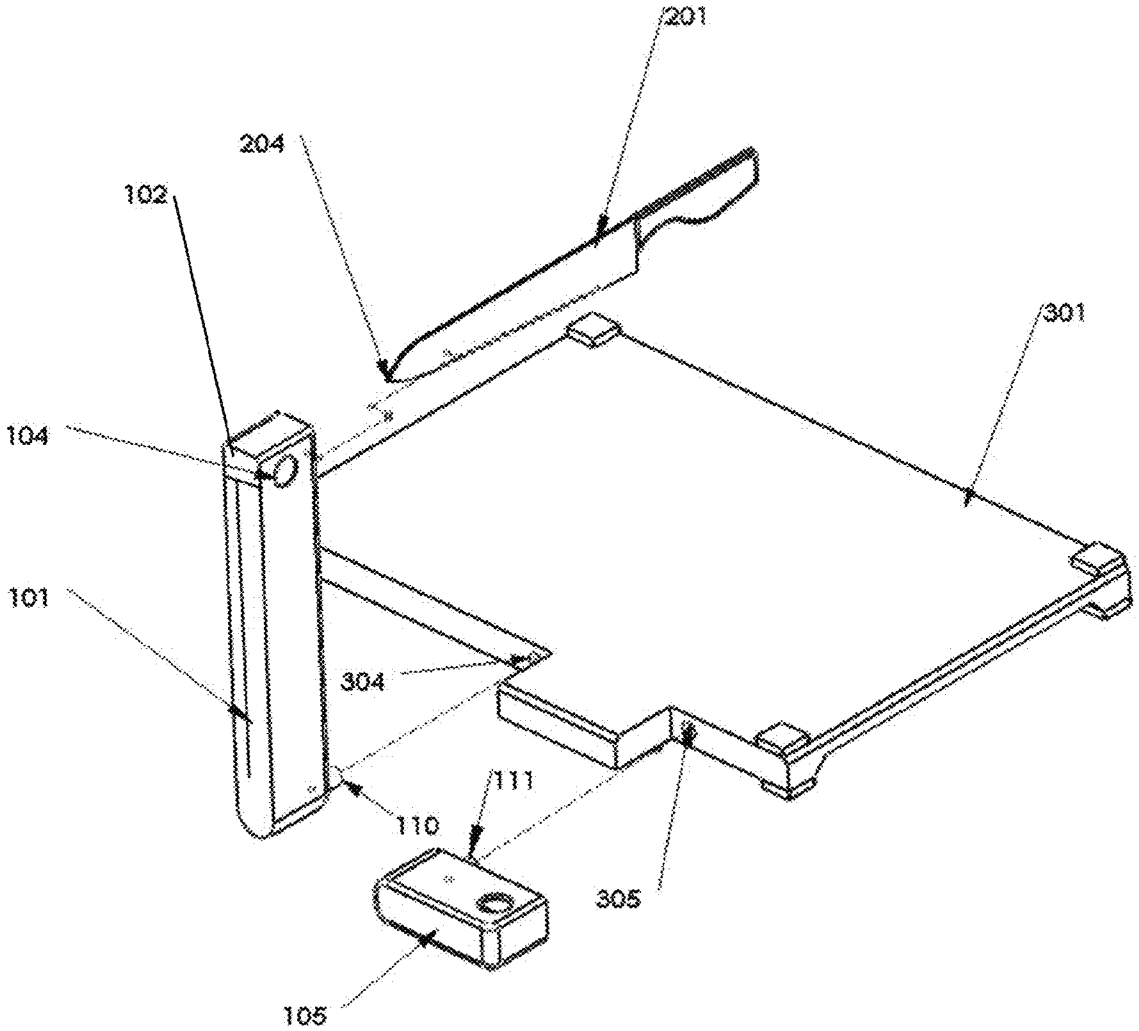
FIG. 4 is a dissembled view of the leverage based cutting apparatus.

FIG. 4 shows exploded view of the leverage based cutting system wherein the towers 101, 105 are shown dissembled from the base 301. The means of attachment 110 on tower 101 is inserted in the provision 304 on the base 301. The means of attachment 111 on tower 105 is inserted in the provision 305 on the base 301. However, a user is free to interchange the use of towers 101, 105 by any provision 304, 305 of the base 301 through the means of attachment 110, 111. The mutual arrangement of the means of attachments 110, 111 and provisions 304, 305 allows the respective towers 101, 105 to rotate to a maximum movement of 180 degrees with respect to the base 301.

Figure 5:
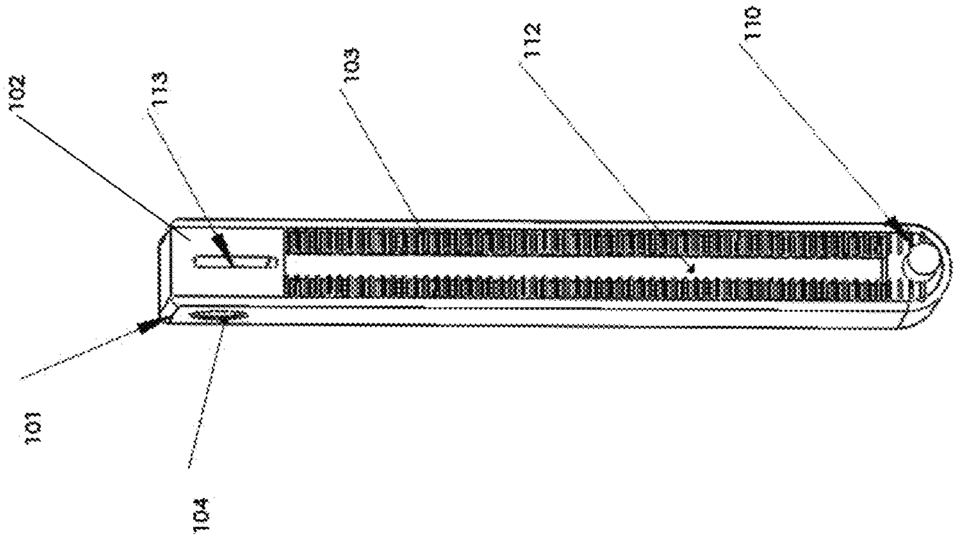
FIG. 5 is a front view of the tower detached from the leverage based cutting apparatus, showing toothed rack on front face, sliding holster with receiving groove and attachment means.
Figure 6:
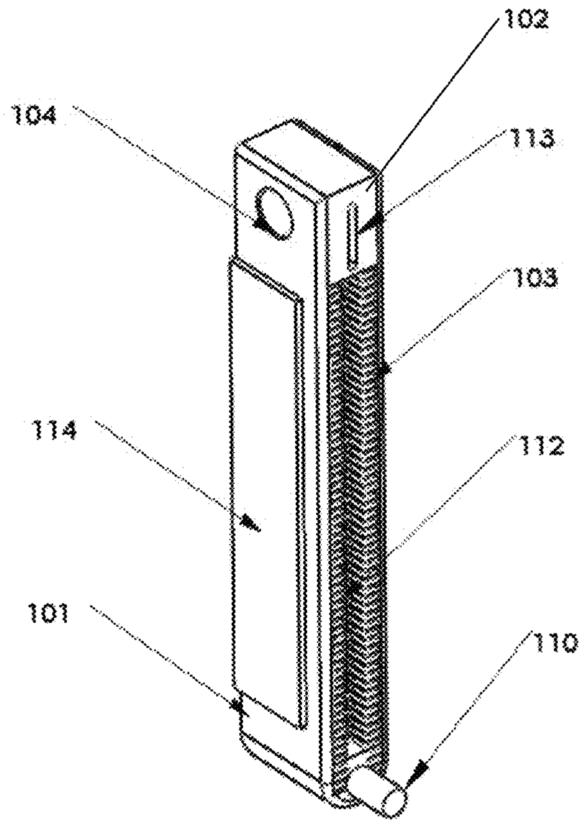
FIG. 6 is a side view of the tower detached from the leverage based cutting apparatus, showing toothed rack on front face, knife sharpener and sliding holster.

FIGS. 5 and 6 refer to a detached tower 101 showing toothed rack 103, an opening slot or channel 112 between the racks 103 through with the sliding holster 102 can slide up and down. A cutting device can be inserted in holster opening 113 on the sliding holster 102 enabling the sliding holster to lock with the toothed rack 103. The tower 101 has an attachment means 110 on front and knife sharpener 114 on wall.

Figure 7A:
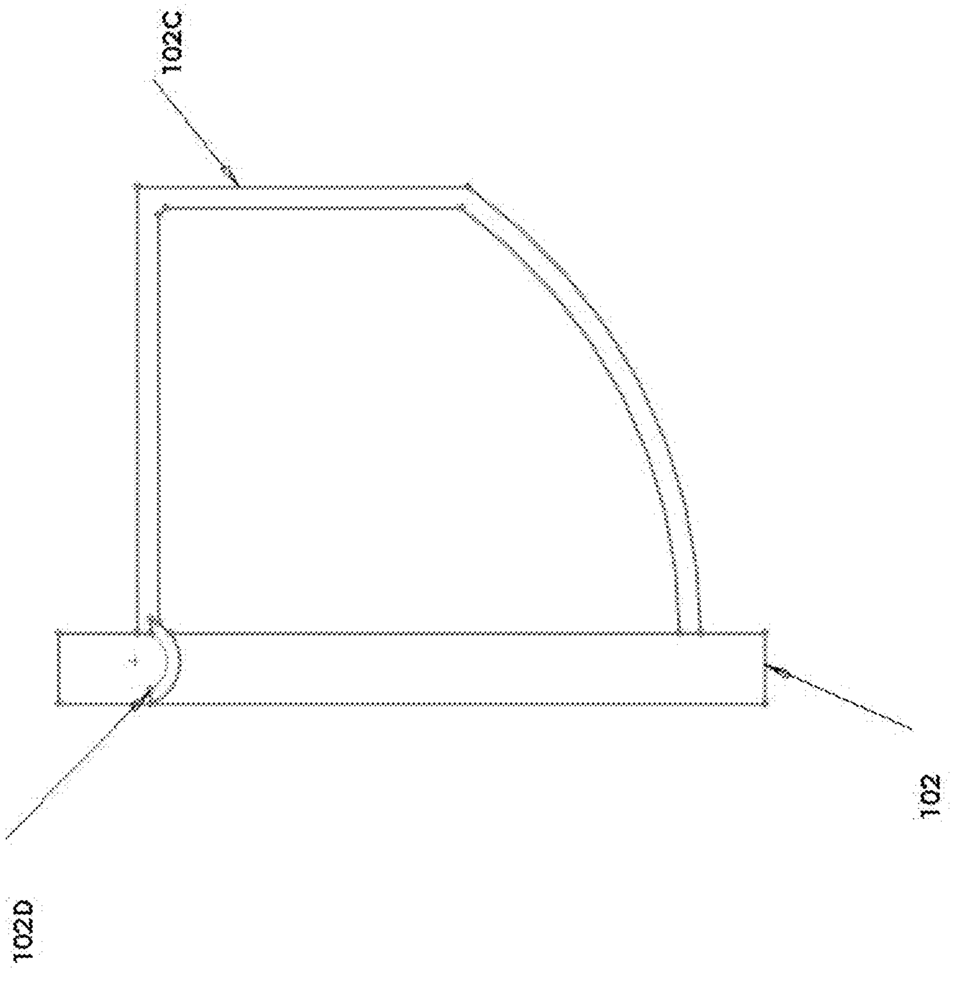
FIG. 7A is a side view of dissembled sliding holster.

FIG. 7A refers to side view of dissembled sliding holster 102 showing rear wall 102C and an auto-release resistant member 102D made of rubber or any other elastomeric material. The auto-release resistant member 102D provides a fulcrum for an engaged cutting device and helps to reduce the likelihood of unwanted auto release of the knife.

Figure 7B:
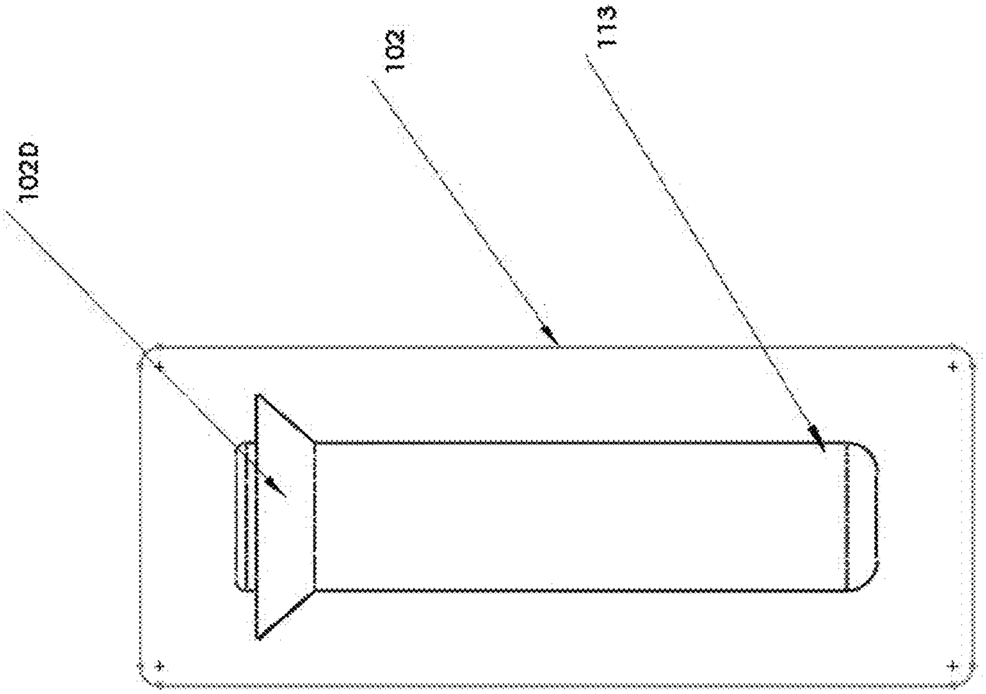
FIG. 7B is a front view of dissembled sliding holster.

FIG. 7B refers to front view of dissembled sliding holster 102 showing the holster opening 113 with an auto-release resistant member 102D.

Figure 7C:
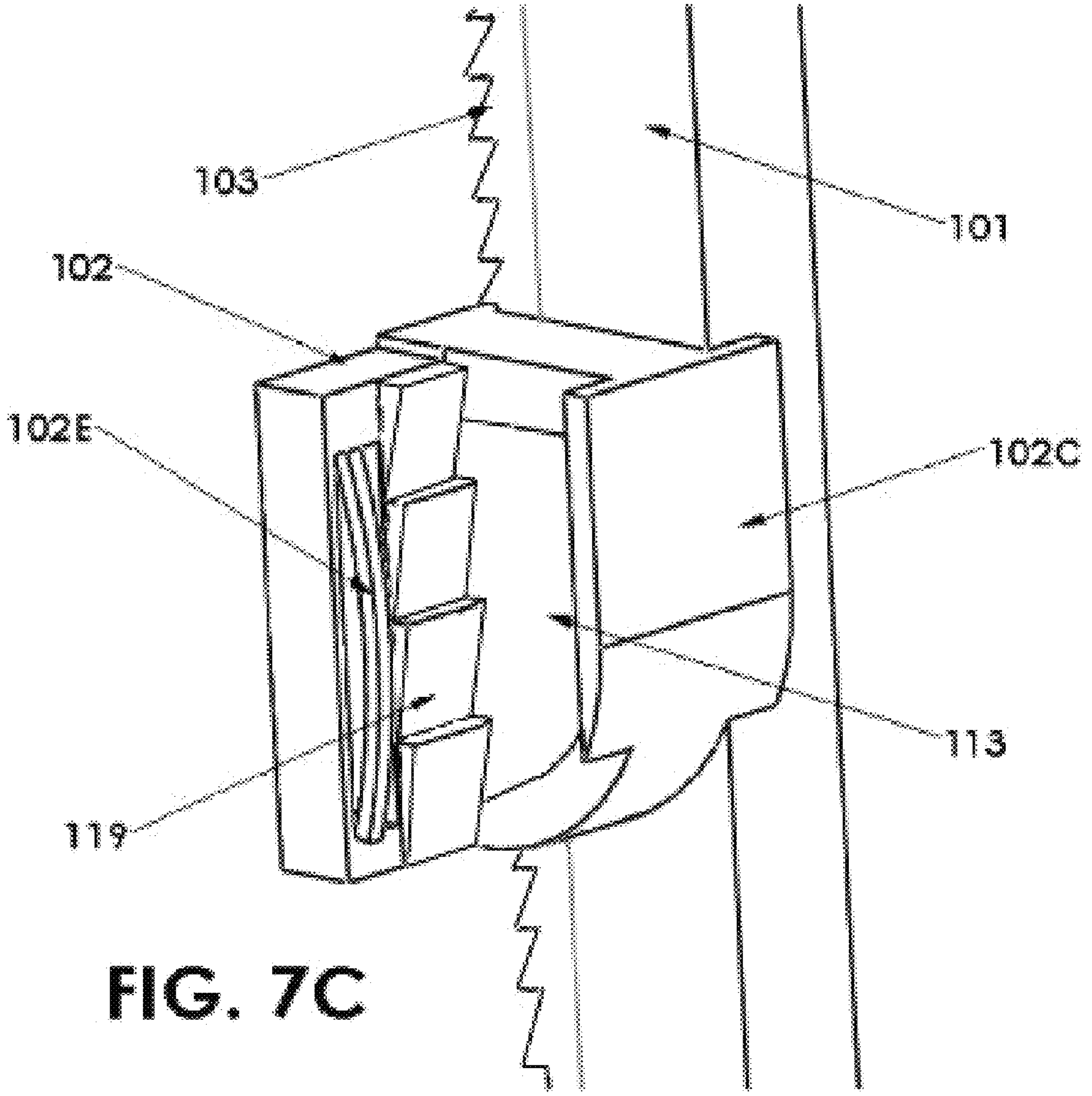
FIG. 7C is a sectional view of sliding holster.

FIG. 7C refers to a sectional view showing sliding holster 102 attached to the wall of tower 101. The sliding holster 102 has the ability to move vertically upward and downward along the plane of tower 101. The elastomeric force of a spring member 102E on the sliding holster 102 generate an outward force on the sliding holster 102 to disengage the tooth 119 from the toothed rack 103. The knife will engage through the holster opening 113 and the push force of the knife on the rear wall 102C would obviate the force generated by the spring member 102E thus locking at least one tooth 119 of sliding holster with at least one toothed rack 103 of the tower 101. The pressure of spring member 102E is sufficient to prevent the sliding holster 102 from moving under gravity.

Figure 7D:
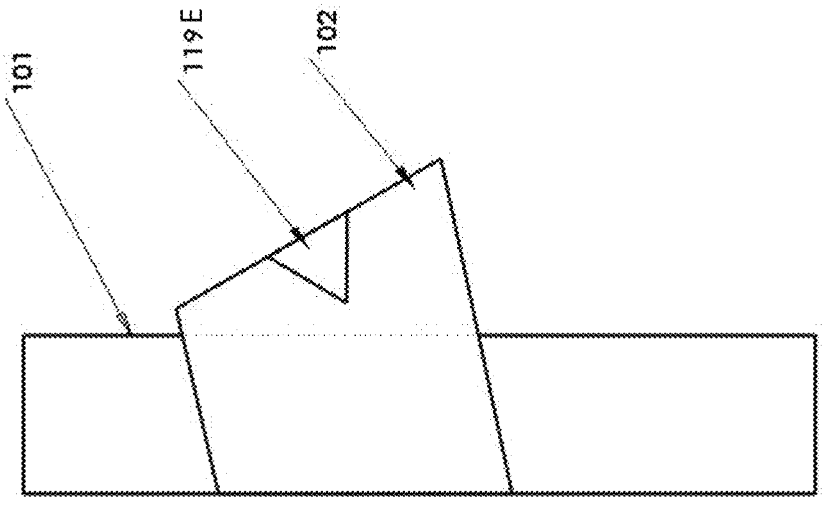
FIG. 7D is an unlocked view of sliding holster.
Figure 7E:
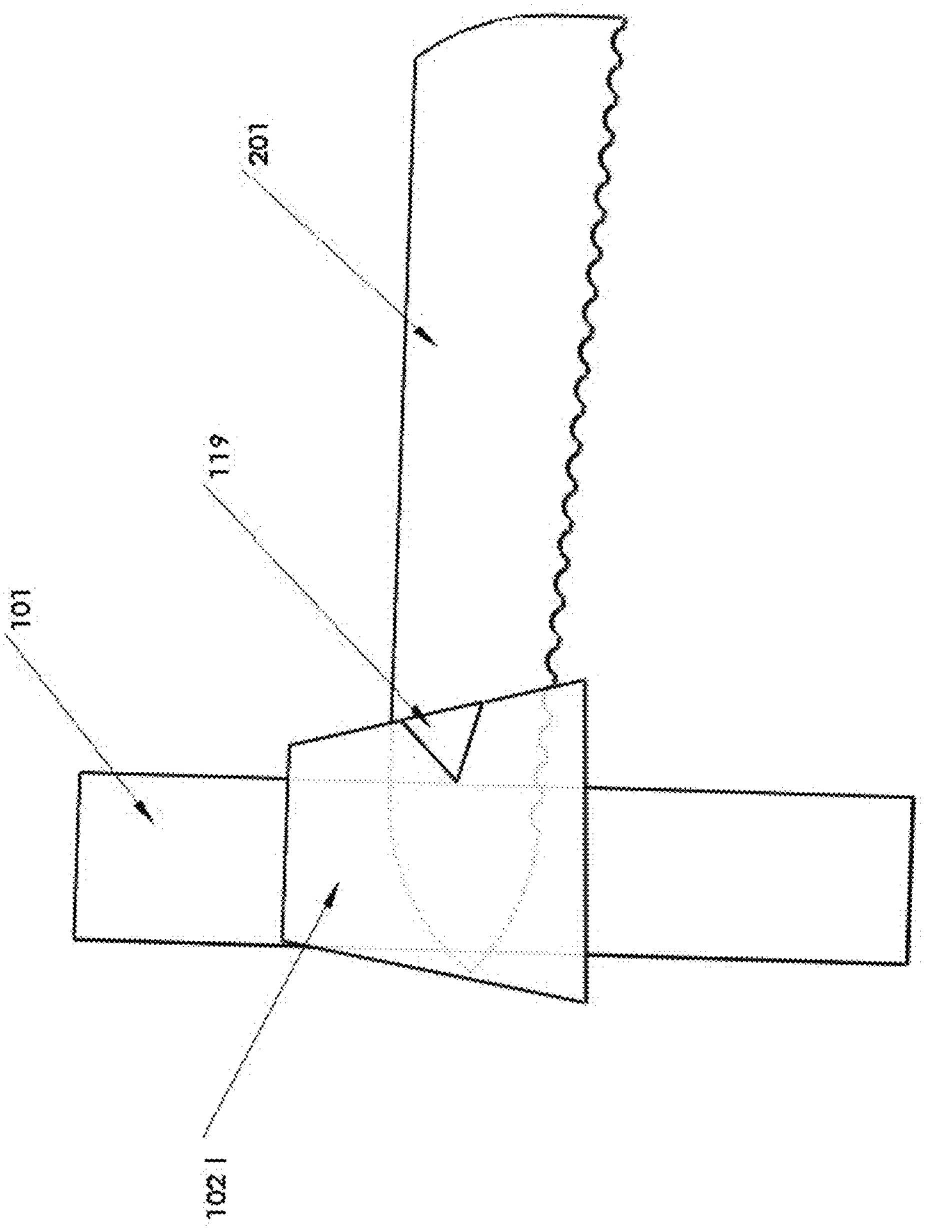
FIG. 7E is a locked view of sliding holster.

According to the alternate embodiments with respect to the various locking mechanisms disclosed, FIGS. 7D & 7E refer to unlocked and locked sliding holster 102J respectively. A trapezoid shaped sliding holster 102J rotates upon pressure from cutting device 201. An outward pressure, generated by an elastomeric leaf spring, a tooth 119E is disengaged as referred in FIG. 7D keeping the sliding holster 102J in unlocked position. Referring to FIG. 7E Pushing of cutting device 201 overcomes outward pressure of the leaf spring, and locks the tooth 119E on sliding holster 102J with the tower 101.

Figure 8A:
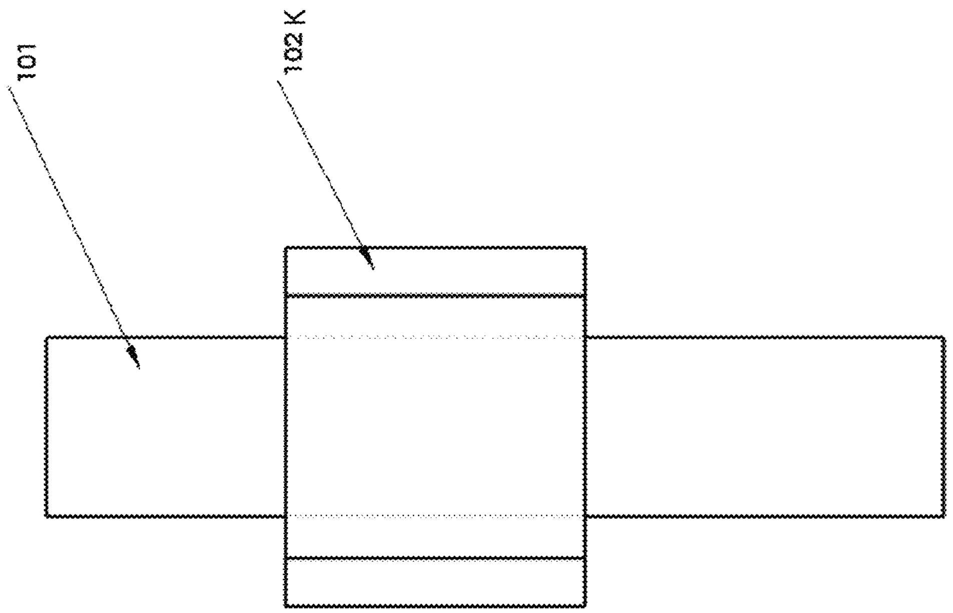
FIG. 8A is a unlocked view of frictional locking mechanism.
Figure 8B:
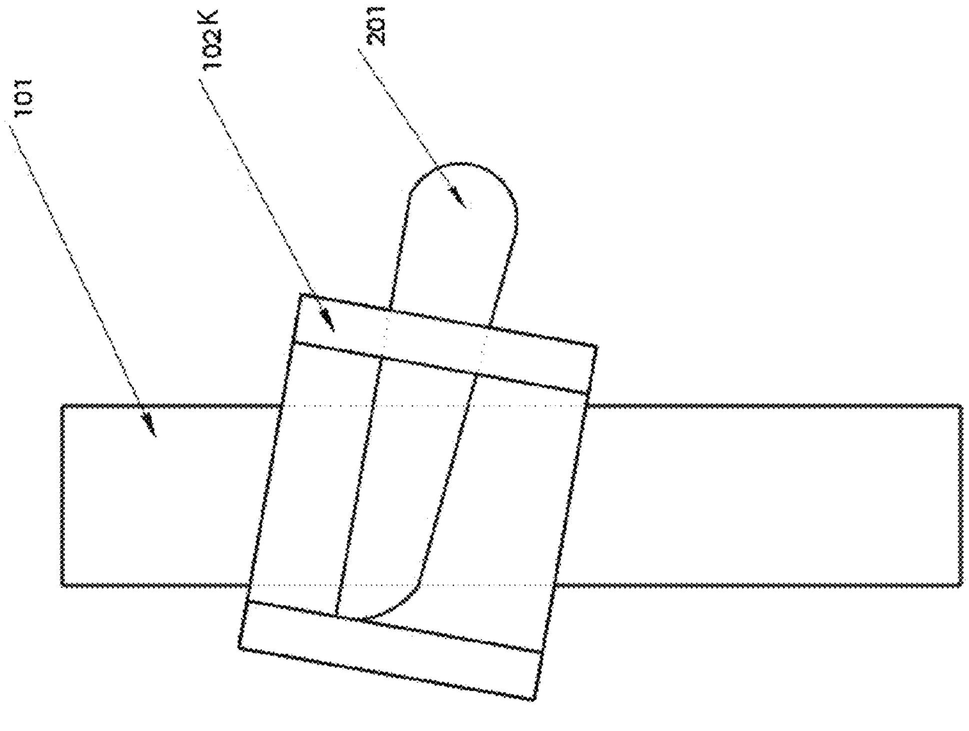
FIG. 8B is an locked view of frictional locking mechanism.

According to the yet another alternate embodiments with respect to the locking mechanisms disclosed, FIGS. 8A & 8B refer to unlocked and locked sliding holster 102 respectively. Pushing of cutting device 201 pivots sliding holster 102K and decreases its movement on the tower 101 due to generation of natural friction between tower 101 and sliding holster 102K as referred in FIG. 8B. In absence of any push, the sliding holster 102K can be slid up and down easily along the tower 101 as referred in FIG. 8A.

Figure 8C:
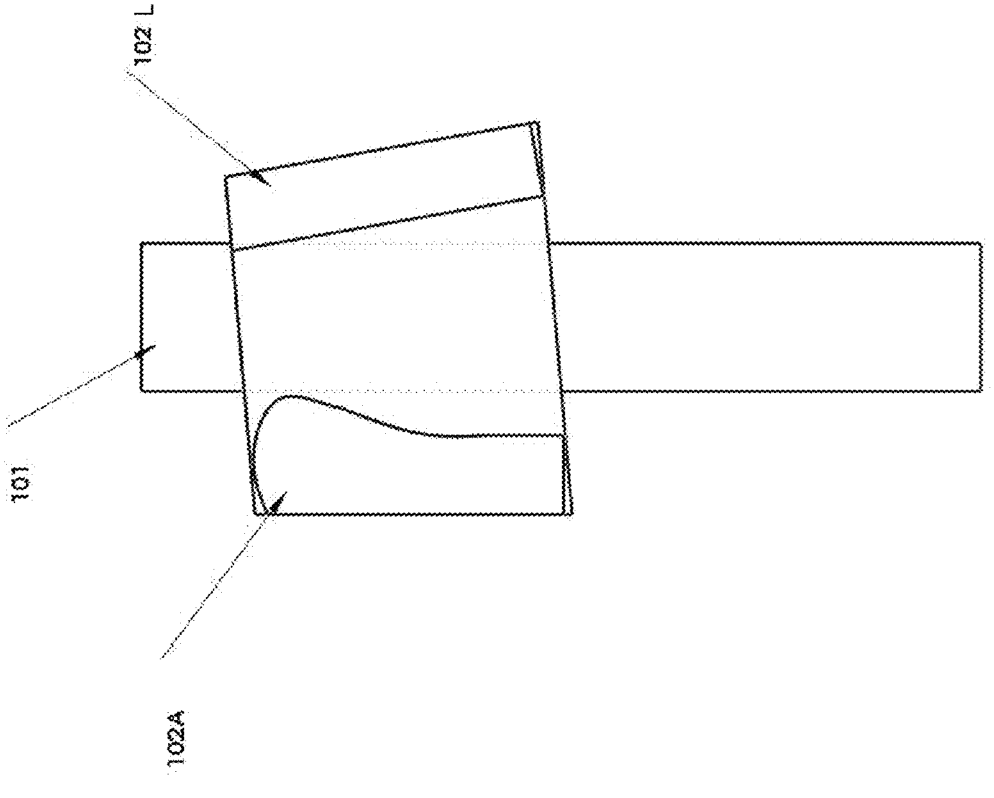
FIG. 8C is a unlocked view of another frictional locking mechanism.
Figure 8D:
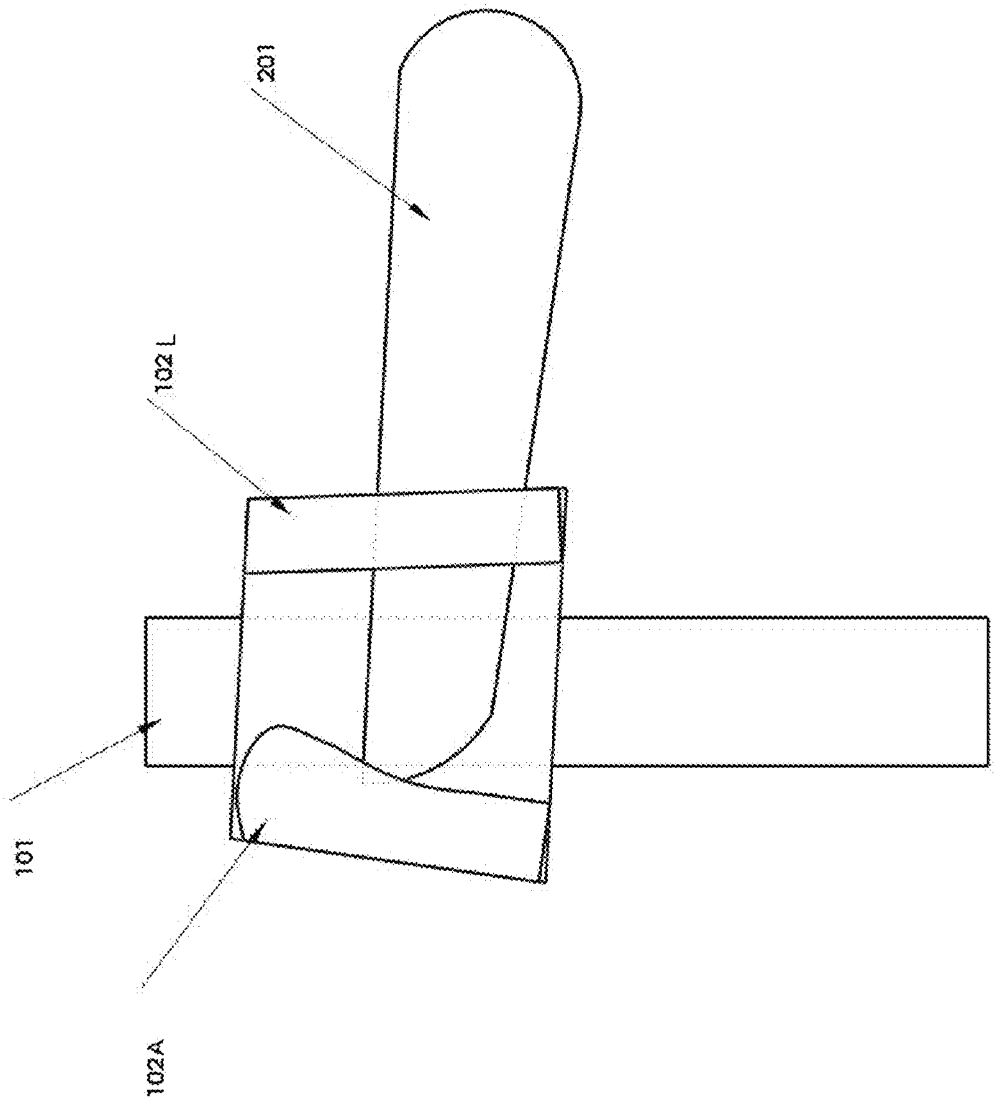
FIG. 8D is a locked view of another frictional locking mechanism.

According to the yet another alternate embodiments with respect to the locking mechanisms disclosed, FIGS. 8C & 8D refer to unlocked and locked sliding holster 102L respectively. Frictional force is generated using cam lock bushing mechanism wherein pushing of cutting device 201 pivots sliding holster 102L and decreases its movement on the tower

101 due to increased surface of the area of contact between the bushings 102A and the tower 101 as referred in FIG. 8C. In absence of any push, the bushing 102A disengages and the sliding holster 102L can be slid up and down easily along the tower 101 as referred in FIG. 8D.

Figure 8E:
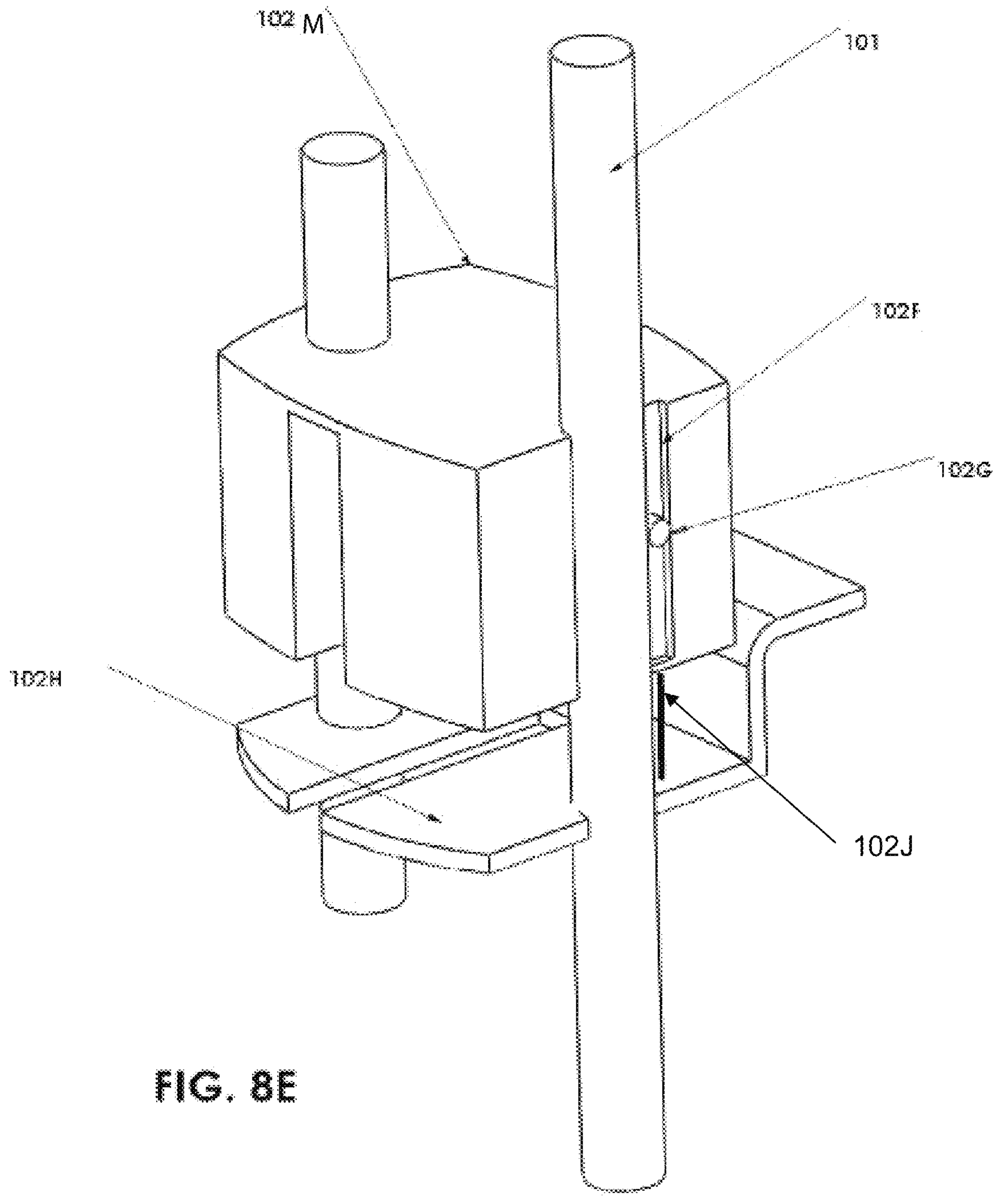
FIG. 8E and FIG. 8F are views of a ball ramp locking arrangement.
Figure 8F:
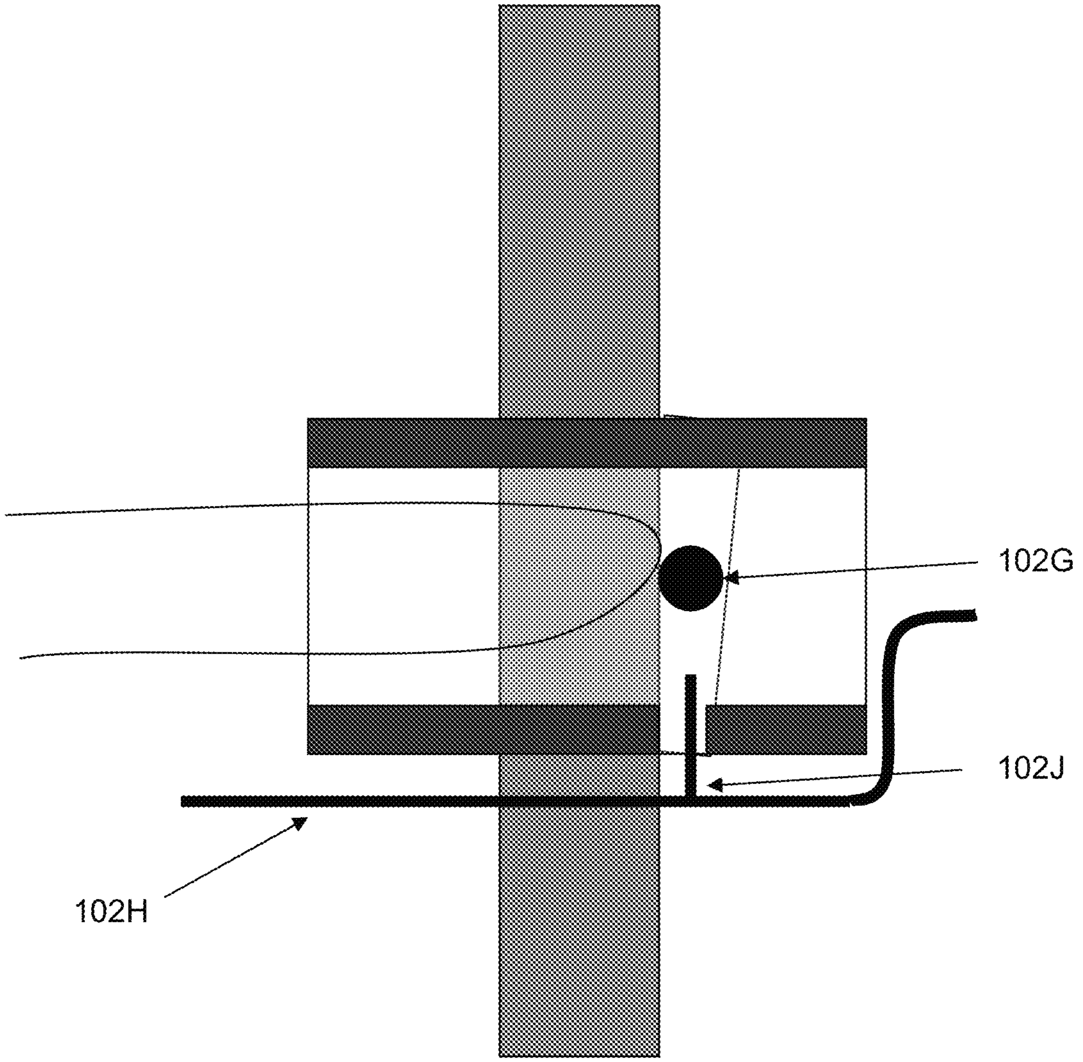

According to still another alternate embodiment with respect to the locking mechanisms disclosed, FIGS. 8E & 8F refer to a ball ramp locking arrangement. This locking arrangement has a floating ball 102G positioned in a socket 102F of sliding holster 102M. When the sliding holster 102M slides vertically upward along the plane of tower 101, the floating ball 102G is forced downwards in the socket 102F thus applying a pressure to squeeze the tower 101 and locking the sliding holster 102M with the tower 101. The unlocking is performed by knocking the floating member upwards with a pin 102J that can be inserted into the socket 102F through an opening in the supporting unit 102H.

Figure 9A:
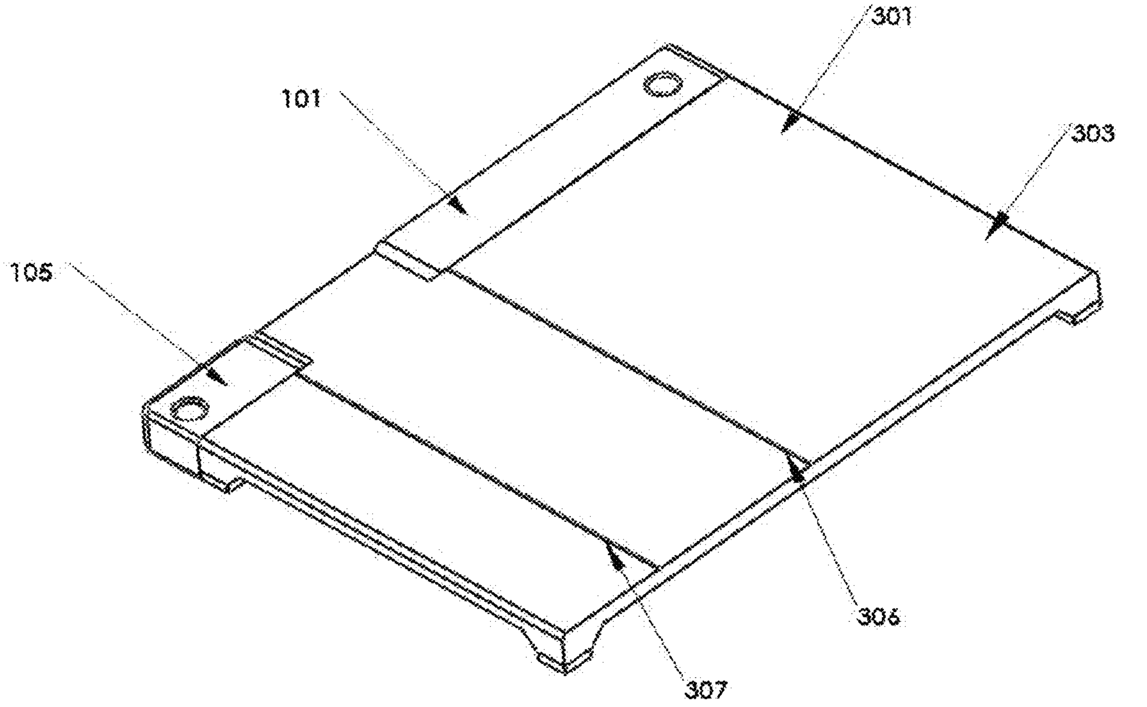
FIG. 9A is a perspective view of the leverage based cutting apparatus showing towers flipped down and adjacent to the base.
Figure 9B:
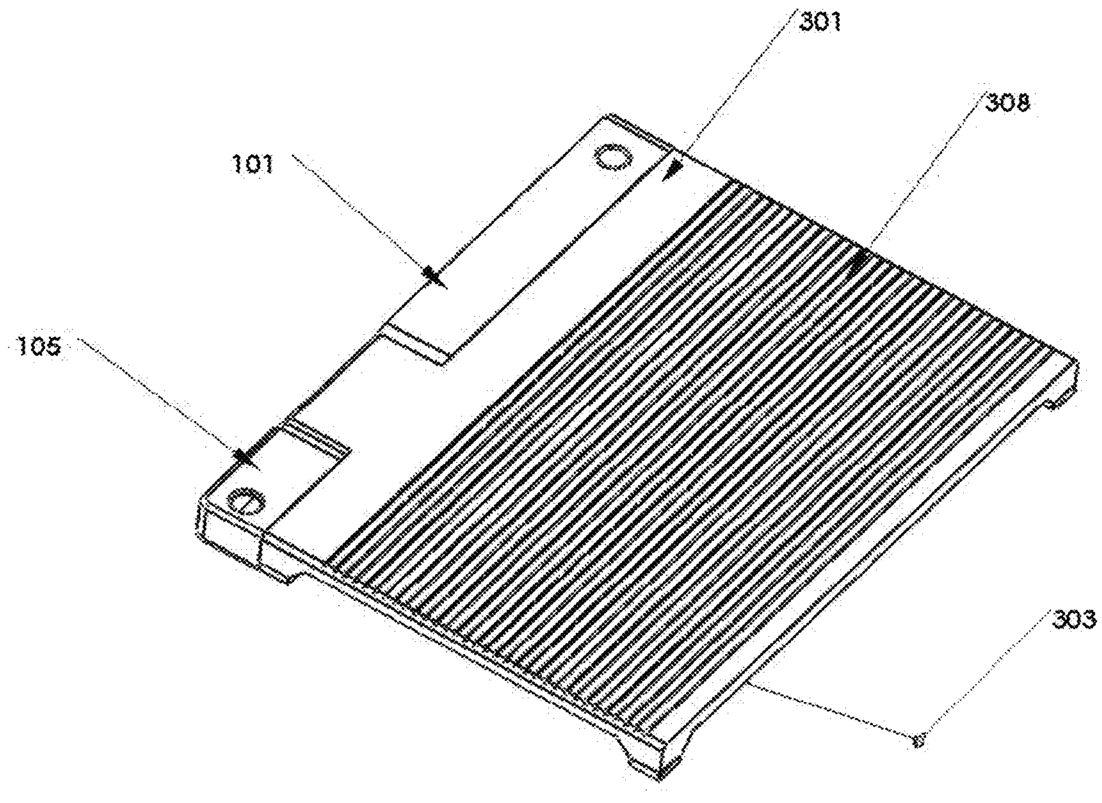
FIG. 9B is a perspective view of the leverage based cutting apparatus showing an uneven textured surface of the base.

FIG. 9A refers to perspective view of leverage based cutting apparatus with two flip-towers 101, 105 attached in storage position, horizontally adjacent to base 301. The base 301, showing its smooth surface 303, has grooves 307, 306 encapsulated by a variety of materials to enhance the functionality of the system; for example, a metal strip so as to obviate the chipping of the base surface itself or a variable durometer deformable elastomeric strip. The base 301 can be made of any suitable material like wood, thermoplastic, metal etc. The grooves 307, 306 may extend around the base to cover unevenly textured surface 308 shown in FIG. 9B.

Figure 10:
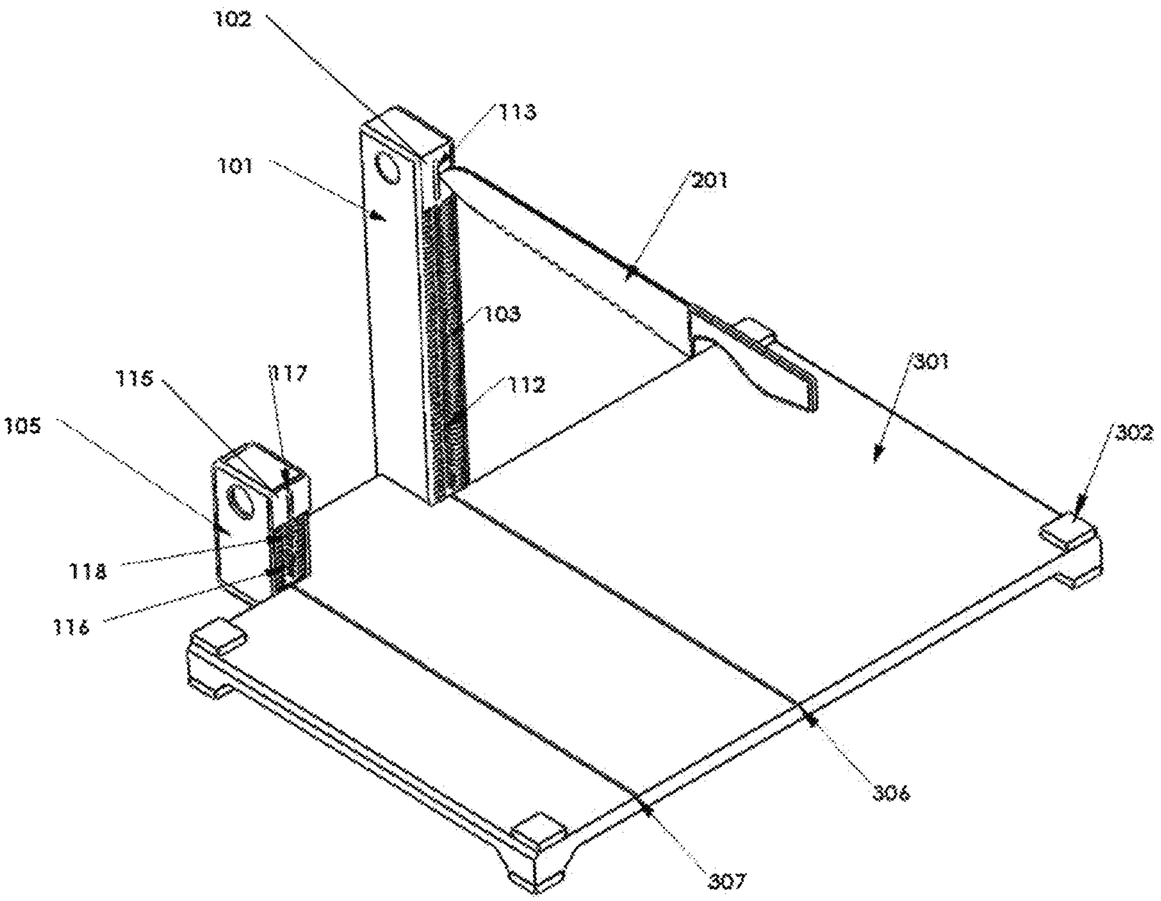
FIG. 10 is a perspective view of the leverage based cutting apparatus with plurality of detachable towers.

Referring to FIG. 10, a modification of said leverage based cutting apparatus is shown with two flip-towers 101, 105 attached to base 301 having two opposing surfaces 303, 308. The base 301 has anti-skid elements 302 at each corner and grooves 307, 306 encapsulated by a variety of materials to enhance the functionality of the system; for example, a metal strip so as to obviate the chipping of the base surface itself or a variable durometer deformable elastomeric strip. The tower 101 is shown with a sliding holster 102 in which a cutting device 201 is engaged through an opening slot 113 which slides over the toothed racks 103 on front face of the tower 101 having an opening slot 112 for allowing constrained linear travel of the sliding holster 102 in it. At least one tooth of the sliding holster 102 is engaged with at least one toothed rack 103. The tower 105 is shown with a sliding holster 115 having an opening slot 117 which slides over the toothed racks 118 on front face of the tower 105 having an opening slot 116 for allowing constrained linear travel of the sliding holster 115 in it. At least one tooth of the sliding holster 115 is engaged with at least one toothed rack 118.

Figure 11:
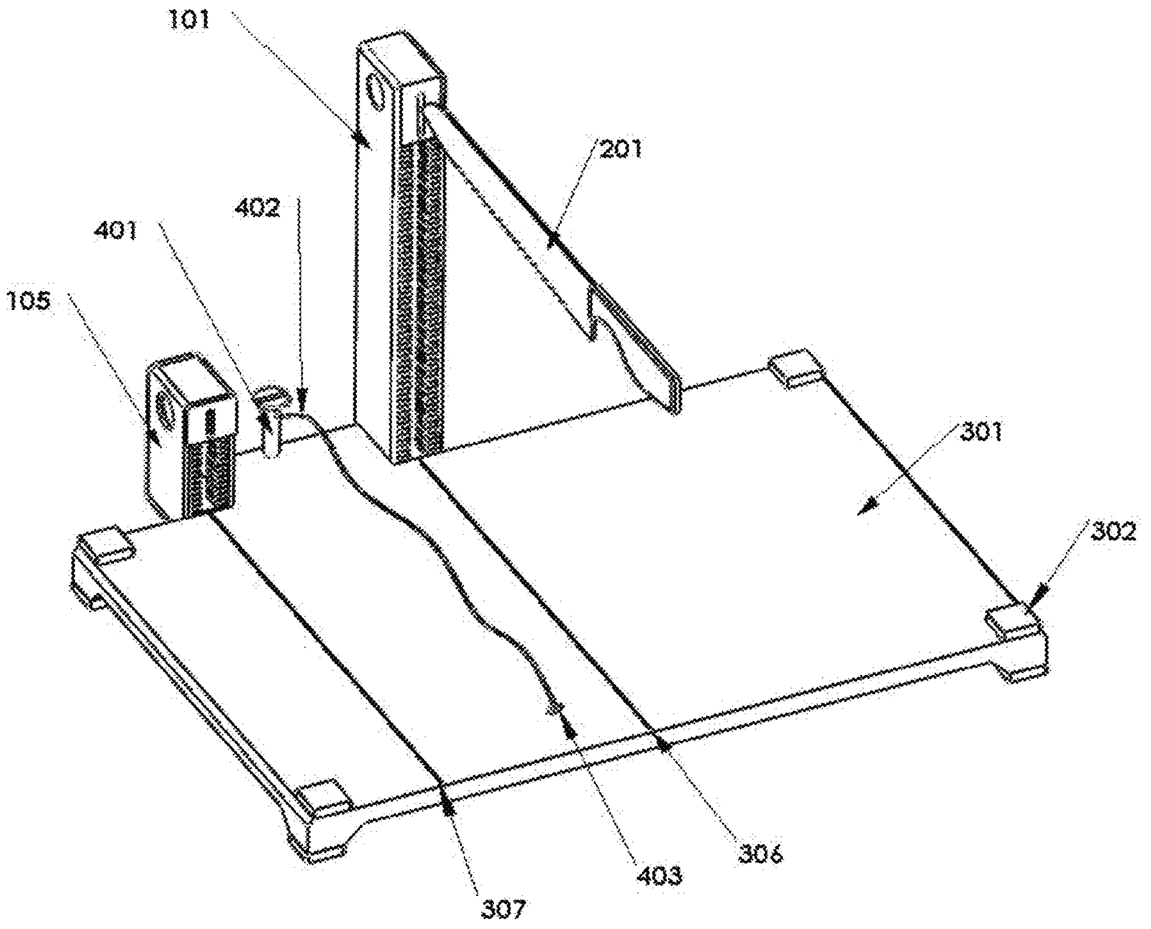
FIG. 11 is a perspective view of the leverage based cutting apparatus with plurality of detachable towers with cheese wire.

Referring to FIG. 11, an another modification of said leverage based cutting apparatus is shown with two flip-towers 101, 105 attached to the base 301 having anti-skid elements 302 at each corner and grooves 306, 307. The base 301 has a removable means of attachment 401 to connect a cheese cutting wire 402 to base 301, the other end of cheese cutting wire 402 is attached to a knob or handle 403.

Figure 12:
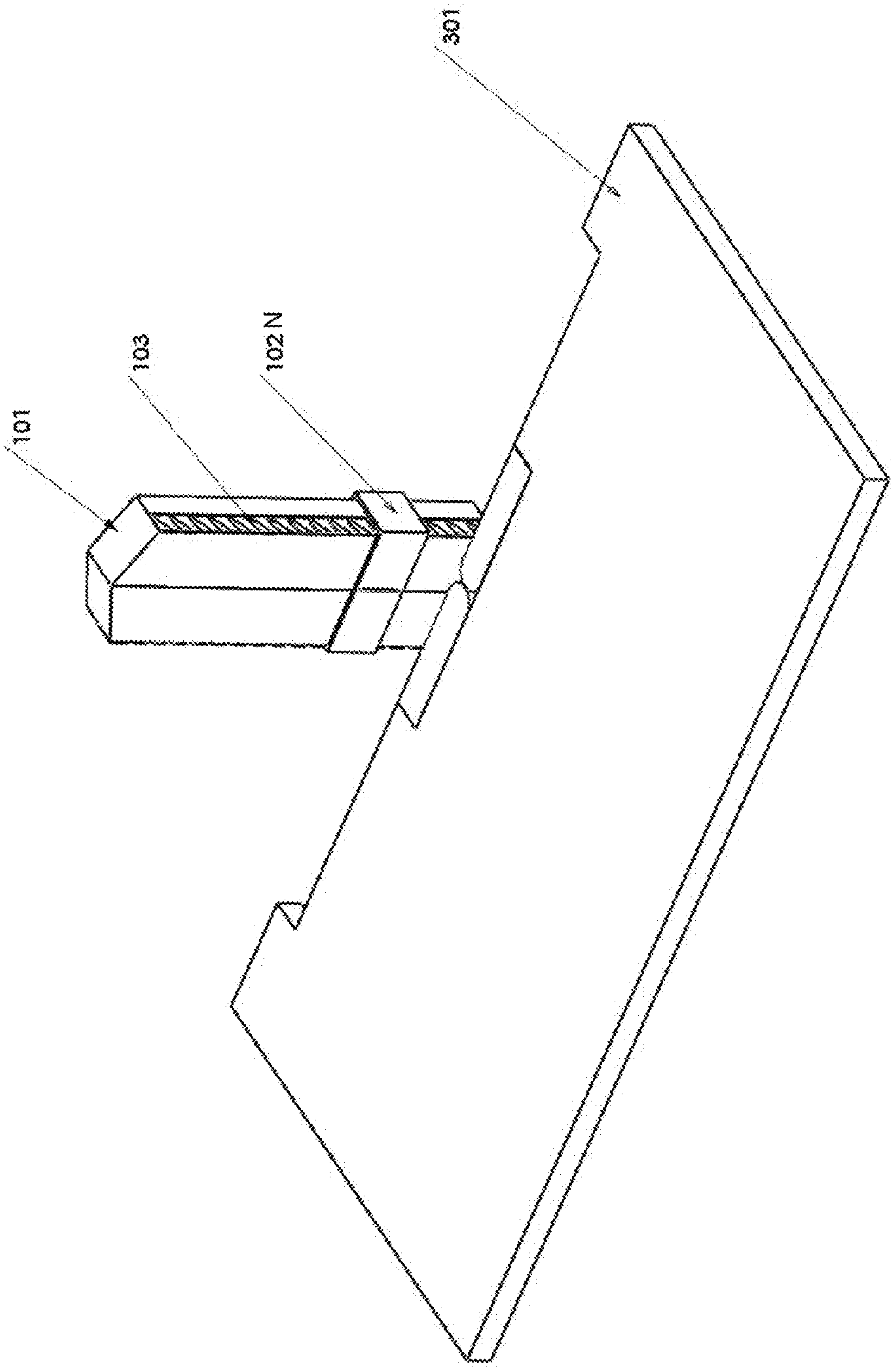
FIG. 12 is a perspective view of the leverage based cutting apparatus with split tower having wrap and semi wrap sliding holster.

FIG. 12 refers to a leverage based cutting apparatus having a base 301 attached to a split tower 101 having toothed rack 103 on side walls, and a wrap-around or semi-wrap-around sliding holster 102N.

Based on the foregoing description, it will be readily understood by the persons skilled in the art that the present invention represents broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A leverage based cutting apparatus comprising:
- a tower being detachable and rotatable around its axis of attachment having a toothed rack, an opening slot and a sliding holster having at least one tooth and an opening to receive a cutting device;
- a base having a first surface to receive an article to be sliced, opposite a second surface equally capable of receiving an article to be sliced; wherein the surfaces have a groove to receive the cutting device in operation; and wherein the base has a provision for said tower to be attached;
- a cutting device having an anterior end, a posterior end, a holding member and at least one cutting edge; and
- a sliding mechanical locking system wherein the sliding holster is mechanically locked to the toothed rack when at least one tooth on the sliding holster is engaged with at least one toothed rack.

2. The leverage based cutting apparatus according to claim 1, wherein said tower is attached vertically to the base while in use and is rotated to a resting position horizontally parallel to said base when not in use.

3. The leverage based cutting apparatus according to claim 1, wherein multiple towers of variable heights are attached to said base.

4. The leverage based cutting apparatus according to claim 1, wherein said tower comprises two diagonally separable arms being positionable between an operating position arranged together generally perpendicular to the base and a storage position arranged generally diagonally separated and adjacent to the base.

5. The leverage based cutting apparatus according to claim 4, wherein said sliding holster is positioned in wrapped-around or semi-wrapped-around position to lock together the arms of said tower.

6. The leverage based cutting apparatus according to claim 1, wherein at least one toothed rack is positioned upon one of a front face, rear face, side face, internal face and beveled face of said tower.

7. The leverage based cutting apparatus according to claim 1, wherein a knife sharpener is attached to said tower.

8. The leverage based cutting apparatus according to claim 1, wherein said sliding holster attached to said tower comprises an auto-release resistant member incorporated in said opening.

9. The leverage based cutting apparatus according to claim 1, wherein one of said surfaces of said base is smooth textured.

10. The leverage based cutting apparatus according to claim 9, wherein the surface opposing said smooth surface has an uneven texture.

11. The leverage based cutting apparatus according to claim 1, wherein said groove holds a variable durometer elastomeric compound to receive a radiused cutting edge of said cutting device when in operation.

12. The leverage based cutting apparatus according to claim 1, wherein said base has a cheese slicing apparatus attached to it, wherein said cheese slicing apparatus comprises: a handle, a cheese cutting wire made of a metal or plastic strand having an anterior end attached to said base and a posterior end attached to a bottom of said handle and a removable anchoring member to enable attachment of cheese cutting wire with said base.

13. The leverage based cutting apparatus according to claim 1, wherein said surfaces of the base have anti-skid elements attached at the corners.

14. The leverage based cutting apparatus according to claim 1, wherein said cutting device is a common kitchen cutting device comprising one of a chef's knife, carving knife, paring knife, and boning knife.

15. The leverage based cutting apparatus according to claim 1, wherein said sliding mechanical locking system comprises said sliding holster having a spring member oriented to establish a gap between the tooth and toothed rack wherein said spring member exerts pressure to disengage the sliding holster from said rack when not in operation, and wherein the tip of a cutting device when engaged in said sliding holster exerts a counter-pressure to overcome the pressure of said spring member to lock said sliding holster with the toothed rack while in use.

16. A leverage based cutting apparatus comprising:

a tower being detachable and rotatable around its axis of attachment, a window or side holes, an opening slot and a sliding holster having an opening to receive a cutting device;

a base having first surface to receive an article to be sliced, opposite a second surface equally capable of receiving an article to be sliced; wherein the surfaces have a groove to receive a cutting device in operation; and wherein the base has a provision for said tower to be attached;

a cutting device having an anterior, a posterior end, and a holding member and at least one cutting edge extending from the anterior end till the holding member; and a sliding frictional locking system wherein the sliding holster is frictionally locked and unlocked to the tower by the user's control.

17. The leverage based cutting apparatus according to claim 16, wherein said sliding frictional locking system comprises an arrangement of said sliding holster with said tower to generate substantial friction between the mutually adjacent faces of said sliding holster and said tower, wherein the friction is generated using a bushing mechanism or cam-lock system.

18. The leverage based cutting apparatus according to claim 16, wherein said sliding frictional locking system comprises a ball ramp locking arrangement having a floating ball, socket, and a supporting unit; wherein the floating ball freely positioned in the socket of said sliding holster moves downward under gravity, when said sliding holster slides vertically upward, said floating ball engages in the socket thus applying a pressure on tower to lock the sliding holster with the tower; and wherein the unlocking is performed by knocking of the floating ball upwards with an external device inserted into the socket through an opening in the supporting unit.

19. A leverage based cutting apparatus comprising:

a tower being detachable and rotatable around its axis of attachment, having at least one toothed rack, a window or side holes, an opening slot and a sliding holster having at least one tooth and an opening to receive a cutting device;

a base having first surface to receive an article to be sliced, opposite a second surface equally capable of receiving an article to be sliced; wherein the surfaces have a groove to receive the cutting device in operation; and wherein the base has a provision for tower to be attached;

a cutting device having an anterior, a posterior end, and a holding member and at least one cutting edge extending from the anterior end till the holding member; and a pivot locking system wherein the sliding holster is pivotally locked to the toothed rack wherein a spring member keeps the member normally rotated forward so that the tooth is not engaged with the rack, and as the user pushes the cutting device forward, the pressure on the back of the member from the anterior end of the cutting device overcomes the spring member pressure and the sliding holster rotates toward the rear and at least on tooth on the sliding holster is engaged with at least one tooth on said toothed rack.

20. The leverage based cutting apparatus according to claim 19, wherein said pivot locking system comprises said sliding holster having internal shape of a trapezoid allowing said member to rotate upon pressure from said cutting device wherein a spring member keeps said member rotated forward with the tooth disengaged with said rack, and wherein the tip of cutting device when engaged in said sliding holster exerts a counter-pressure to overcome the pressure of said spring member to lock said sliding holster with at least on tooth on said toothed rack while in use.

* * * * *